United States Patent
Authement et al.

(10) Patent No.: US 9,798,493 B2
(45) Date of Patent: Oct. 24, 2017

(54) FIRMWARE BYPASS FOR MEDIUM-ACCESS COMMANDS

(71) Applicant: International Business Machines Corporation, Armonk, NY (US)

(72) Inventors: Shawn P. Authement, Round Rock, TX (US); Christopher M. Dennett, Houston, TX (US); Gowrisankar Radhakrishnan, Rochester, MN (US); Donald J. Ziebarth, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 14/106,890

(22) Filed: Dec. 16, 2013

(65) Prior Publication Data
US 2015/0169254 A1    Jun. 18, 2015

(51) Int. Cl.
*G06F 3/06*    (2006.01)

(52) U.S. Cl.
CPC .......... *G06F 3/0659* (2013.01); *G06F 3/0604* (2013.01); *G06F 3/0679* (2013.01); *G06F 2003/0697* (2013.01)

(58) Field of Classification Search
CPC .......... G06F 2003/0697; G06F 3/0659; G06F 3/0604; G06F 3/0679
See application file for complete search history.

(56) References Cited

U.S. PATENT DOCUMENTS

| | | | |
|---|---|---|---|
| 7,155,716 B2* | 12/2006 | Hooman | G06F 9/4881 711/100 |
| 7,680,977 B2 | 3/2010 | Luo et al. | |
| 7,877,593 B2 | 1/2011 | Tomlin et al. | |
| 8,291,295 B2 | 10/2012 | Harari et al. | |
| 2002/0073296 A1* | 6/2002 | Buch | G06F 12/0284 711/202 |
| 2002/0080652 A1* | 6/2002 | Kendall et al. | 365/185.22 |
| 2008/0184077 A1* | 7/2008 | Kuttan | G06F 11/0745 714/48 |
| 2009/0164704 A1 | 6/2009 | Kanade et al. | |
| 2009/0193145 A1* | 7/2009 | Coronado | G06F 3/0605 709/240 |
| 2009/0282308 A1* | 11/2009 | Gutsche | G06F 11/1052 714/746 |
| 2012/0066447 A1 | 3/2012 | Colgrove et al. | |
| 2012/0221767 A1* | 8/2012 | Post | G06F 13/1673 711/103 |
| 2012/0284460 A1* | 11/2012 | Guda | G06F 3/061 711/114 |

(Continued)

*Primary Examiner* — Daniel Tsui
*Assistant Examiner* — Jane Wei
(74) *Attorney, Agent, or Firm* — Bryan D. Wells; David M. Quinn (57) ABSTRACT

An interface receives a command corresponding to a non-volatile memory. The interface determines whether a bypass mode is enabled and whether the command is a medium-access command. A primary processing node processes the command in response to determining at least one of the following: that the bypass mode is disabled or that the command is not a medium-access command. A secondary processing node processes the command, in response to determining that the bypass mode is enabled and that the command is a medium-access command.

20 Claims, 6 Drawing Sheets

(56) References Cited

U.S. PATENT DOCUMENTS

| | | |
|---|---|---|
| 2012/0303855 A1 | 11/2012 | Bakke et al. |
| 2013/0019051 A1 | 1/2013 | Somanache et al. |
| 2013/0061232 A1* | 3/2013 | Bernbo ............. G06F 17/30212 |
| | | 718/103 |
| 2013/0086311 A1 | 4/2013 | Huang et al. |
| 2013/0124932 A1 | 5/2013 | Schuh et al. |

\* cited by examiner

FIRMWARE BYPASS FOR MEDIUM-ACCESS COMMANDS

FIELD OF THE INVENTION

The present invention relates generally to the field of non-volatile storage systems, and more particularly to firmware bypass for medium-access commands.

BACKGROUND OF THE INVENTION

A solid-state drive ("SSD") is a data storage device using integrated circuit assemblies as memory to store data persistently. The primary memory component in an SSD may be NAND flash non-volatile memory or NOR flash non-volatile memory. NAND flash and NOR flash utilize floating-gate transistors. NAND flash and NOR flash are named after the logic gate which their respective assemblies resemble.

SSD memories are accessed much like block devices, such as hard disks or memory cards. Each block consists of a number of pages. The pages can be, for example, 512, 2048, or 4096 bytes in size. While reading and programming is performed on a page basis, erasure can only be performed on a block basis.

Small Computer System Interface ("SCSI") is a set of standards for physically connecting and transferring data between electronic devices, including SSDs. The SCSI standards define commands, protocols and electrical and optical interfaces, including task management functions. A task management function is an error recovery mechanism implemented by the software to influence and alter processing of certain commands, their sequence and so on.

SUMMARY

Embodiments of the present invention provide a method and system for non-volatile storage. An interface receives a command corresponding to a non-volatile memory. The interface determines whether a bypass mode is enabled and whether the command is a medium-access command. A primary processing node processes the command in response to determining at least one of the following: that the bypass mode is disabled or that the command is not a medium-access command. A secondary processing node processes the command, in response to determining that the bypass mode is enabled and that the command is a medium-access command.

DETAILED DESCRIPTION

Embodiments of the present invention recognize that: (i) non-volatile storage systems may receive medium-access commands and non-medium-access commands; (ii) such non-volatile storage systems may include one or more solid-state drives (hereinafter "SSDs" or, singularly, an "SSD"); (ii) medium-access commands include read and write commands; (iii) commands may have different performance priorities relative to one another; (iv) medium-access commands may have a higher performance priority than non-medium-access commands; (v) an SSD may need to track all active commands, for example to employ task management functions of a small computer system interface (hereinafter "SCSI"); and (vi) tracking non-medium-access commands may impact the performance of the non-volatile storage system when handling medium-access commands.

Embodiments of the present invention provide for: (i) handling medium-access commands separately from non-medium-access commands; (ii) monitoring for task management commands; (iii) tracking all active commands in response to task management commands; and (iv) prioritizing medium-access commands according to performance paths of different relative priorities.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. The term "computer-readable storage media" does not include computer-readable signal media.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk® (note: the term(s) "Java", "Smalltalk" and the like may be subject to trademark rights in various jurisdictions throughout the world and are used here only in reference to the products or services properly denominated by the marks to the extent that such trademark rights may exist), C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
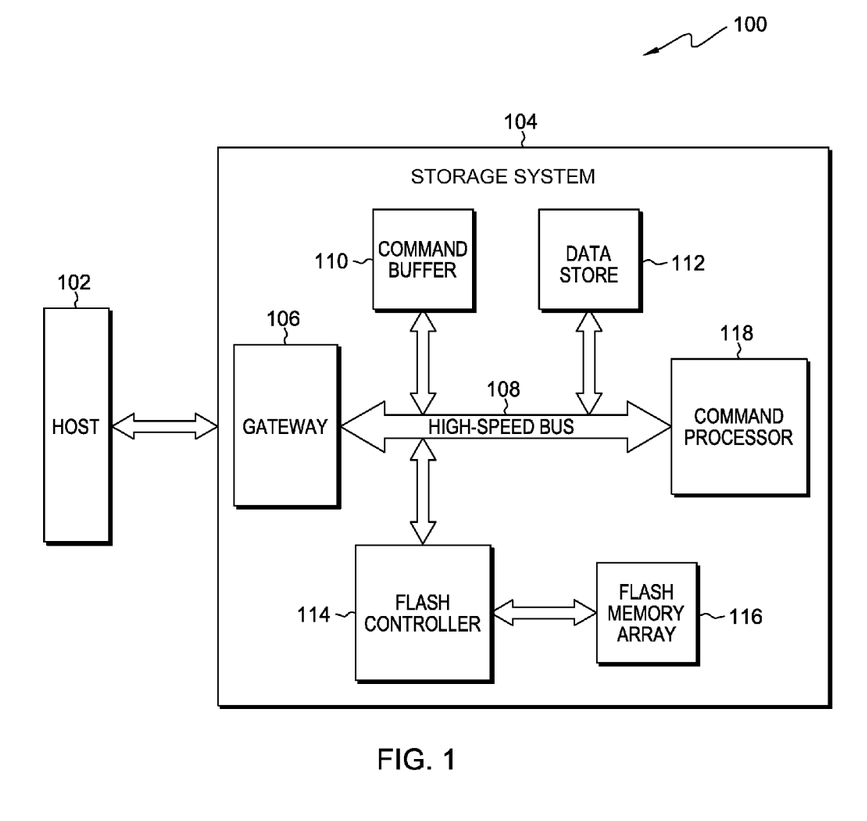
FIG. 1 is a functional block diagram illustrating a non-volatile storage system, in accordance with an embodiment of the present invention.

The present invention will now be described in detail with reference to the Figures. FIG. 1 is a functional block diagram illustrating a storage system, generally designated 100, in accordance with one embodiment of the present invention.

Storage system 100 includes host 102 and storage system 104. Host 102 may be a laptop computer, a tablet computer, a netbook computer, a personal computer (PC), a desktop computer, a personal digital assistant (PDA), a smart phone, or any programmable electronic device capable of communicating with storage system 104. In one embodiment, storage system 104 is a storage system or storage subsystem of host 102.

In one embodiment, storage system 104 is a non-volatile storage system. Host 102 communicates with storage system 104 via gateway 106. In one embodiment, host 102 and storage system 104 may be communicatively coupled via one or more of a range of layers of controllers, busses, or devices. Host 102 may communicate with storage system 104 using any known communication protocol, a few examples of which include SATA, SCSI, SAS, USB, and FibreChannel. The communication protocol allows for the use of tagged commands, such that multiple read and/or write commands may be pending on storage system 100 simultaneously. Tagged commands can include tagged command queuing and native command queuing tags.

Storage system 104 includes gateway 106, command buffer 110, data store 112, flash controller 114, and command processor 118, all interconnected via high-speed bus 108. Storage system 104 also includes flash memory array 116, which is in communication with flash controller 114.

Gateway 106 receives commands from host 102. A command is a data structure which identifies an operation. The command may be a medium-access command, which is a command which identifies a read operation or write operation. A medium-access command identifies a portion of flash memory array 116. For example, a medium-access command may identify a write operation for a portion of flash memory array 116, in which case the medium-access command may include data to write to the portion of flash memory array 116. The command may be a non-medium-access command, which is a command which identifies an operation other than a read operation or a write operation. For example, a non-medium-access command may request device status, device driver information, or other information. In one embodiment, a command includes a performance flag, which indicates a performance path of the command (e.g., high performance path, medium performance path, or low performance path).

Gateway 106 comprises a processing node (e.g., a computer processor). Gateway 106 can dispatch the commands to command processor 118 and/or flash controller 114 via high-speed bus 108. Gateway 106 includes a firmware bypass function, which may be enabled or disabled. For example, the bypass function may be disabled during initial boot-up of gateway 106 or during error recovery. In one embodiment, gateway 106 dispatches commands to command processor 118 when the firmware bypass function is disabled. In one embodiment, gateway 106 dispatches the commands to command processor 118 or flash controller 114 when the firmware bypass function is enabled. For example, when the firmware bypass function of gateway 106 is enabled, gateway 106 may dispatch medium-access commands to flash controller 114 and non-medium-access commands to command processor 118.

Command buffer 110 is a buffer which stores commands. In one embodiment, gateway 106 stores commands to command buffer 110. In one embodiment, command buffer 110 comprises one or more queues, each of which can store one or more commands. In some embodiments, command processor 118 receives or retrieves commands from command buffer 110. In one embodiment, command buffer 110 can report the capacity of each queue. For example, command buffer 110 can report the capacity of each queue to gateway 106, to command processor 118, or to host 102. In one embodiment, command buffer 110 reports a higher capacity for each queue than the actual capacity for the queue (sometimes referred to as "over-provisioning" of queues).

For example, if a first queue is full, then commands will overflow from the first queue to a second queue which is not full.

Data store 112 is a repository. In one embodiment, data store 112 stores information corresponding to one or more types of commands. For example, the types of commands may include media-access commands such as read commands and write commands, and non-medium-access commands, such as task management commands. In one embodiment, gateway 106 determines whether a received command is a medium-access command by utilizing information of data store 112 corresponding to medium-access commands. In one embodiment, data store 112 stores at least one pre-allocated buffer. For example, a pre-allocated buffer of data store 112 may be used for a command being executed through a high performance path (see FIG. 3 and accompanying discussion). Pre-allocated buffers may be re-usable. In another embodiment, data store 112 stores at least one buffer which is allocated in response to a command. For example, data store 112 may store a buffer allocated in response to a command being executed through a low priority path (see FIG. 5 and accompanying discussion).

Flash controller 114 receives commands from gateway 106. In some embodiments, flash controller 114 can receive or retrieve commands from command buffer 110. In one embodiment, flash controller 114 receives commands from command processor 118. Flash controller 114 can execute commands. For example, flash controller 114 may receive a read command from gateway 106 specifying a portion of data stored in flash memory array 116, in which case flash controller 114 may execute the command by retrieving the specified portion of data from flash memory and passing the specified portion of data to gateway 106.

Flash memory array 116 stores data in a manner accessible to flash controller 114. In one embodiment, flash memory array 116 stores data in one or more portions, such as blocks or pages, which may be of a predetermined size (i.e., a predetermined number of bytes). It should be appreciated that the inventions herein can be implemented with a wide range of memory mediums, including for example non-volatile random access memory (NVRAM) technologies such as NAND flash memory, NOR flash memory, phase-change memory (PCM), magnetoresistive RAM (MRAM) and resistive RAM (RRAM). In another embodiment, the systems and methods of this disclosure may be utilized with a hard drive or a hybrid drive including both solid-state and hard drive components.

Command processor 118 receives commands from gateway 106 and dispatches commands to flash controller 114 for execution. In one embodiment, command processor 118 receives non-medium-access commands from gateway 106 and, while the bypass mode of gateway 106 is disabled, command processor 118 also receives medium-access commands from gateway 106. Command processor 118 can enable or disable the bypass mode of gateway 106. In some embodiments, command processor 118 retrieves or receives commands from command buffer 110.

Figure 2:
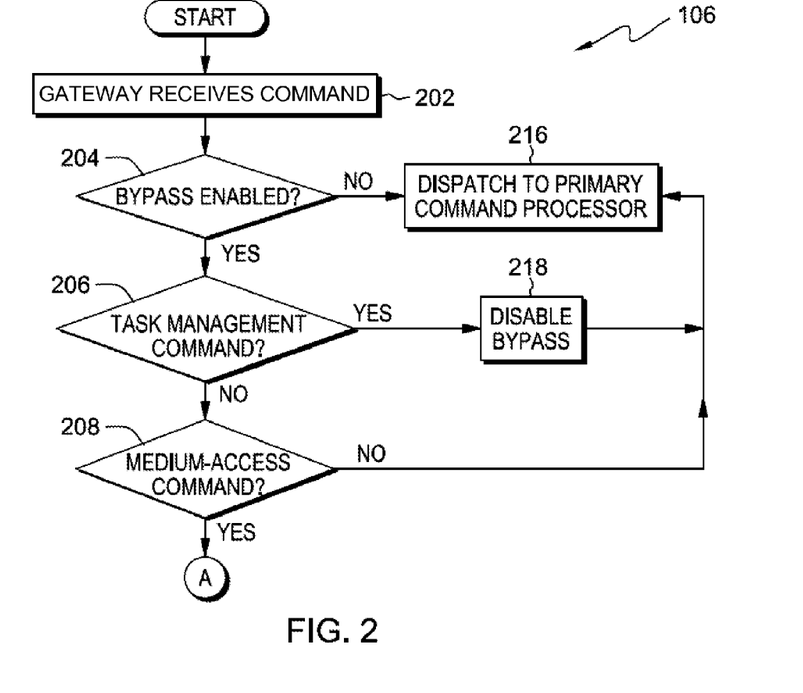
FIG. 2 depicts operations of gateway 106, according to an embodiment of the present invention.

FIG. 2 depicts operations of gateway 106, according to an embodiment of the present invention.

Initially, storage system 104 initializes, during which boot-up period the bypass mode of gateway 106 is disabled. In one embodiment, the bypass mode is enabled upon completion of the boot operation by, for example, gateway 106.

In block 202, gateway 106 receives a command. In one embodiment, gateway 106 receives the command from host 102. In various embodiments, the command may be a medium-access command or a non-medium-access command.

In decision 204, gateway 106 determines whether a firmware bypass function of gateway 106 is enabled. In one embodiment, the firmware bypass function is either enabled or disabled. If gateway 106 determines that the firmware bypass function is disabled (decision 204, NO branch), then gateway 106 dispatches the command to command processor 118. If gateway 106 determines that the firmware bypass function is enabled (decision 204, YES branch), then gateway 106 proceeds to decision 206.

In decision 206, gateway 106 determines whether the command is a task management command. A task management command is a troubleshooting command. Some protocols, for example SCSI, require storage system 104 to track all active commands in response to a task management command. If gateway 106 determines that the command is a task management command (decision 206, YES branch), then gateway 106 disables the bypass function (block 218) and dispatches the command to command processor 118. In one embodiment, disabling bypass mode allows a command processor 118 to track all active commands. In one embodiment, once the task management process is complete, gateway 106 re-enables bypass mode. If gateway 106 determines that the command is not a task management command (decision 206, NO branch), then gateway 106 proceeds to decision 208.

In decision 208, gateway 106 determines whether the command is a medium-access command. If gateway 106 determines that the command is not a medium-access command (i.e., if it is a non-medium-access command) (decision 208, NO branch), then gateway 106 dispatches the command to command processor 118 (block 216). If gateway 106 determines that the command is a medium-access command (decision 208, YES branch), then gateway 106 proceeds via block A, which is continued in FIG. 3.

Figure 3:
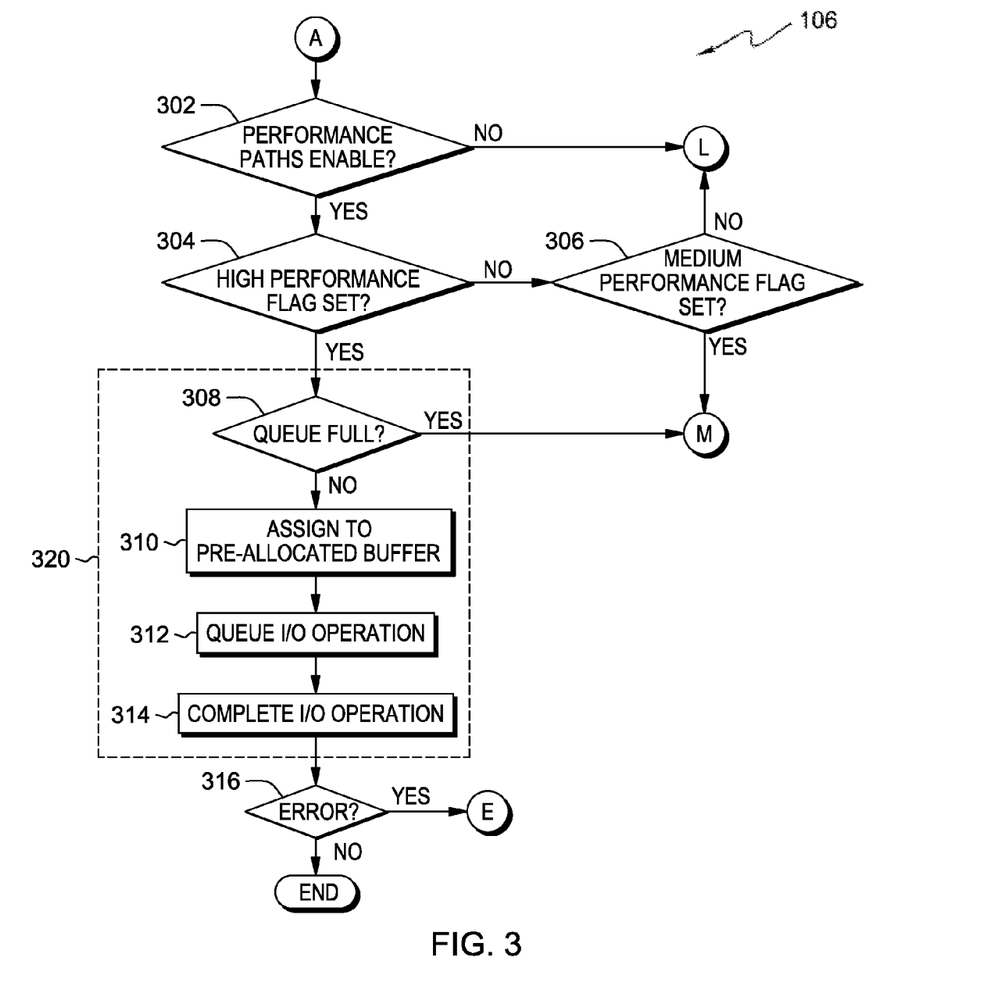
FIG. 3 depicts further operations of gateway 106, according to an embodiment of the present invention.

FIG. 3 depicts further operations of gateway 106, according to an embodiment of the present invention.

In decision 302, gateway 106 determines whether performance paths are enabled. In one embodiment, gateway 106 determines whether performance paths are enabled based on a performance path configuration setting of gateway 106. In one embodiment, gateway 106 handles the medium-access command through a low performance path if the performance paths are not enabled. If gateway 106 determines that performance paths are not enabled (decision 302, NO branch), then gateway 106 proceeds via block L (see FIG. 5). If gateway 106 determines that the performance paths are enabled (decision 302, YES branch), then gateway 106 proceeds to decision 304.

In decision 304, gateway 106 determines whether a high performance flag of the command is set. In one embodiment, a command includes a high performance flag, which may be set or unset. In another embodiment, a command may include a high performance flag, which is set, or the command may include no high performance flag. In yet another embodiment, a command may include a performance flag, which may indicate a performance path of the command (e.g., high, medium, or low), in which case the high performance flag is set when the performance flag is set to indicate a high performance path. If the high performance flag is not set (decision 304, NO branch), then gateway 106 proceeds to decision 306. If the high performance flag is set (decision 304, YES branch), then gateway 106 handles the command via high performance path 320 by proceeding to decision 308.

In decision 306, gateway 106 determines whether a medium performance flag of the command is set. In one embodiment, a command includes a medium performance flag, which may be set or unset. In another embodiment, a command may include a medium performance flag, which is set, or the command may include no medium performance flag. In yet another embodiment, a command may include a performance flag, which may indicate a performance path of the command (e.g., high, medium, or low), in which case the medium performance flag is set when the performance flag is set to indicate a medium performance path. If the medium performance flag is not set (decision 306, NO branch), then gateway 106 proceeds via block L (see FIG. 5). If the medium performance flag is set (decision 306, YES branch), then gateway 106 proceeds via block M (see FIG. 4).

In decision 308, gateway 106 determines whether the high performance queue is full. In one embodiment, gateway 106 may receive more commands having a high performance flag set than may be accommodated by a high performance queue (i.e., the high performance queue may be over-provisioned). If gateway 106 determines that the high performance queue is full (decision 308, YES branch), then gateway 106 exits high performance path 320 and passes the command to the medium performance path by proceeding via block M (see FIG. 4). If gateway 106 determines that the high performance queue is not full (decision 308, NO branch), then gateway 106 proceeds to block 310.

In block 310, gateway 106 assigns the command to a pre-allocated buffer. In one embodiment, the pre-allocated buffer is of a size equal to the size of a flash page of flash memory array 116. In one embodiment, gateway 106 maintains a plurality of pre-allocated buffers of high performance path 320. In one embodiment, gateway 106 maintains a number of pre-allocated buffers at least equal to the number of commands which may be queued in the high-performance queue of gateway 106. In one embodiment, if the pre-allocated buffer of the high performance path is too small for the command, then gateway 106 cannot successfully assign the command to a pre-allocated buffer, which causes an error (see block 316). In another embodiment, if the pre-allocated buffer of the high performance path is too small for the command, then gateway 106 exits high performance path 320 and passes the command to the medium performance path via block M (see FIG. 4).

In block 312, gateway 106 queues the I/O operation. The I/O operation is identified by the command, which is a medium-access command. In one embodiment, the command identifies either a read operation or a write operation which identifies a portion of flash memory array 116 having a size equal to or less than the size of the pre-allocated buffer to which the command is assigned. In one embodiment, gateway 106 associates the command and the pre-allocated buffer with the high performance path queue and decrements the available capacity of the high performance path queue.

In block 314, the I/O operation is completed. In one embodiment, gateway 106 completes the operation. In another embodiment, gateway 106 dispatches the I/O operation to flash controller 114, which completes the I/O operation. In one embodiment, gateway 106 disassociates the command and the pre-allocated buffer with the high performance path queue and increments the available capacity of the high performance path queue.

In decision 316, gateway 106 determines whether an error occurred during the execution of high performance path 320. In one embodiment, gateway 106 determines whether an error occurred during the execution of high performance path 320 by determining whether the I/O operation completed successfully. In another embodiment, gateway 106 determines whether an error occurred during any part of the execution of high performance path 320, including, for example, whether gateway 106 successfully completed decision 308 and blocks 310, 312, and 314. If gateway 106 determines that an error occurred during the execution of high performance path 320 (decision 316, YES branch), then gateway 106 proceeds via block E (see FIG. 6). If gateway 106 determines that an error did not occur during high performance path 320 (decision 316, NO branch), then the operations of gateway 106 are complete.

In some embodiments, when the operations of gateway 106 complete and if gateway 106 determines that an error did not occur during high performance path 320 (decision 316, NO branch), then gateway 106 generates a success message. In one embodiment, gateway 106 sends the success message to host 102. In another embodiment, gateway 106 stores the success message to a log which resides, for example, within gateway 106 or data store 112.

Figure 4:
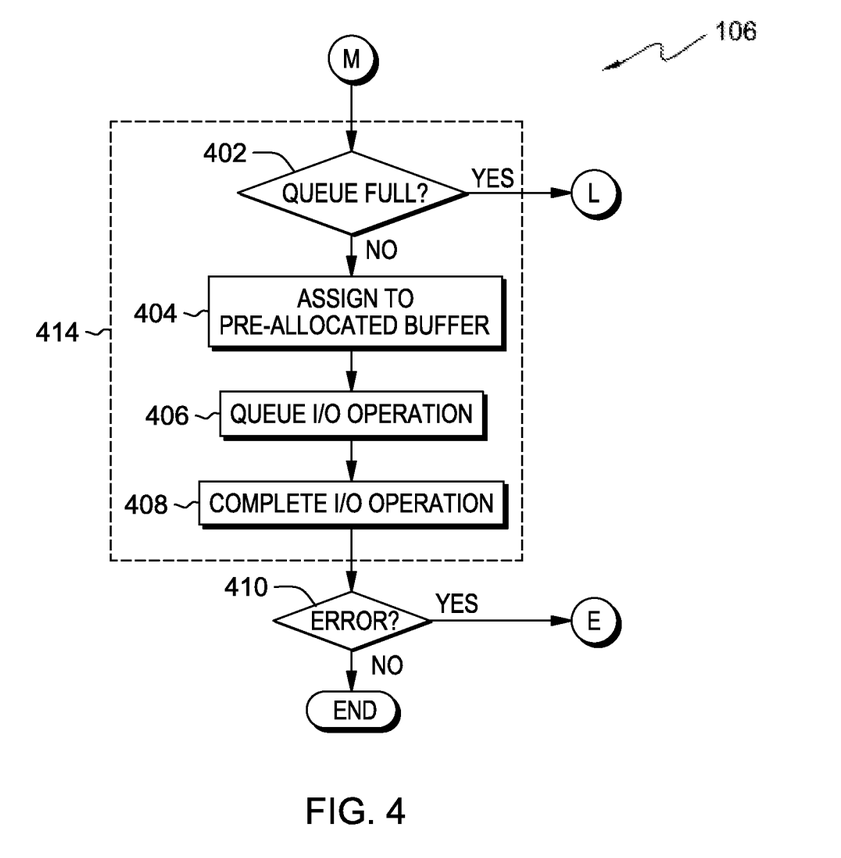
FIG. 4 depicts further operations of gateway 106, according to an embodiment of the present invention.

FIG. 4 depicts further operations of gateway 106, according to an embodiment of the present invention. In one embodiment, gateway 106 processes a command through medium priority path 414. FIG. 4 starts via block M (see FIG. 3 and accompanying discussion).

In decision 402, gateway 106 determines whether the medium performance queue is full. In one embodiment, gateway 106 may receive more commands having a medium performance flag set than may be accommodated by the medium performance queue (i.e., the medium performance queue may be over-provisioned). If gateway 106 determines that the medium performance queue is full (decision 402, YES branch), then gateway 106 exits medium performance path 414 and passes the command to the low performance path by proceeding via block L (see FIG. 5). If gateway 106 determines that the medium performance queue is not full (decision 402, NO branch), then gateway 106 proceeds to block 404.

In block 404, gateway 106 assigns the command to a pre-allocated buffer. In one embodiment, the pre-allocated buffer is of a size equal to a multiple of the size of a flash page of flash memory array 116. For example, the size of a pre-allocated buffer of medium performance path 414 may be equal to three flash pages. In one embodiment, gateway 106 maintains a plurality of pre-allocated buffers of medium performance path 414. In one embodiment, gateway 106 maintains a number of pre-allocated buffers at least equal to the number of commands which may be queued in the medium performance queue of gateway 106. In one embodiment, if the pre-allocated buffer of the medium performance path is too small for the command, then gateway 106 cannot successfully assign the command to a pre-allocated buffer, which causes an error (see block 410). In another embodiment, if the pre-allocated buffer of the medium performance path is too small for the command, then gateway 106 exits medium performance path 414 and passes the command to the low performance path via block L (see FIG. 5).

In block 406, gateway 106 queues the I/O operation. The I/O operation is identified by the command, which is a medium-access command. In one embodiment, the command identifies either a read operation or a write operation which identifies a portion of flash memory array 116 having a size equal to or less than the size of the pre-allocated buffer to which the command is assigned. In one embodiment, gateway 106 associates the command and the pre-allocated buffer with the medium performance path queue and decrements the available capacity of the medium performance path queue.

In block 408, the I/O operation is completed. In one embodiment, gateway 106 completes the operation. In another embodiment, gateway 106 dispatches the I/O operation to flash controller 114, which completes the I/O operation. In one embodiment, gateway 106 disassociates the command and the pre-allocated buffer with the medium performance path queue and increments the available capacity of the medium performance path queue.

In decision 410, gateway 106 determines whether an error occurred during the execution of medium performance path 414. In one embodiment, gateway 106 determines whether an error occurred during the execution of medium performance path 414 by determining whether the I/O operation completed successfully. In another embodiment, gateway 106 determines whether an error occurred during any part of the execution of medium performance path 414, including, for example, whether gateway 106 successfully completed decision 402 and blocks 404, 406, and 408. If gateway 106 determines that an error occurred during the execution of medium performance path 414 (decision 410, YES branch), then gateway 106 proceeds via block E (see FIG. 6). If gateway 106 determines that an error did not occur during medium performance path 414 (decision 410, NO branch), then the operations of gateway 106 are complete.

In some embodiments, when the operations of gateway 106 complete and if gateway 106 determines that an error did not occur during low performance path 414 (decision 410, NO branch), then gateway 106 generates a success message. In one embodiment, gateway 106 sends the success message to host 102. In another embodiment, gateway 106 stores the success message to a log which resides, for example, within gateway 106 or data store 112.

Figure 5:
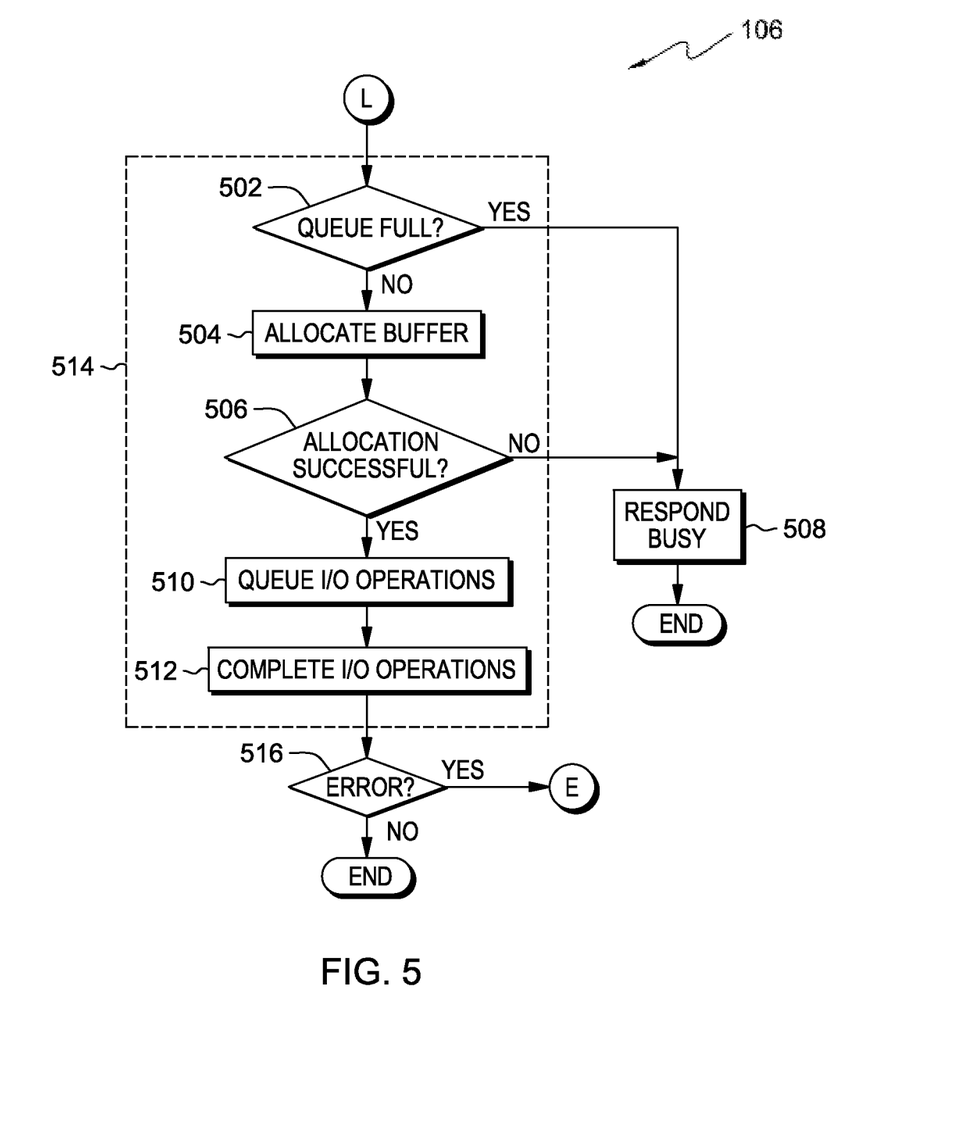
FIG. 5 depicts further operations of gateway 106, according to an embodiment of the present invention.

FIG. 5 depicts further operations of gateway 106, according to an embodiment of the present invention. In one embodiment, gateway 106 processes a command through low priority path 514. FIG. 5 starts via block L (see FIGS. 3 and 4 and the respective accompanying discussions).

In decision 502, gateway 106 determines whether the low performance queue is full. In one embodiment, gateway 106 may receive more commands having a low performance flag set than may be accommodated by the low performance queue (i.e., the low performance queue may be over-provisioned). If gateway 106 determines that the low performance queue is full (decision 502, YES branch), then gateway 106 exits low performance path 514 and proceeds to block 508. If gateway 106 determines that the low performance queue is not full (decision 502, NO branch), then gateway 106 proceeds to block 504.

In block 504, gateway 106 allocates a buffer for the command. In one embodiment, low performance path 514 can allocate buffers of various sizes rather than utilizing pre-allocated buffers of fixed size. In one embodiment, gateway 106 allocates a buffer large enough to store the portion of flash memory array 116 identified by the command. In another embodiment, gateway 106 allocates a buffer by sending an allocation request. For example, gateway 106 may send an allocation request to data store 112 to allocate a buffer.

In decision 506, gateway 106 determines whether the buffer allocation is successful. In one embodiment, gateway 106 determines whether the buffer allocation is successful by comparing the size of the allocated buffer to the command to determine if the allocated buffer is large enough to store the portion of flash memory array 116 identified by the command. In another embodiment, gateway 106 determines whether the buffer allocation is successful based upon the response received by gateway 106 to an allocation request.

If gateway 106 determines that the buffer allocation is successful (decision 506, YES branch), then gateway 106 proceeds to block 510. If gateway 106 determines that the buffer allocation is not successful (decision 506, NO branch), then gateway 106 exits low performance path 514 and proceeds to block 508.

In block 508, gateway 106 responds with a busy message. In one embodiment, gateway 106 generates a busy message indicating that all queues are full. In one embodiment, gateway 106 sends a busy message to host 102. In another embodiment, gateway 106 stores the busy message to a log which resides, for example, within gateway 106. In another embodiment, gateway 106 dispatches the command to command processor 118 in response to the busy message.

In block 510, gateway 106 queues the I/O operation. The I/O operation is identified by the command, which is a medium-access command. In one embodiment, the command identifies either a read operation or a write operation which identifies a portion of flash memory array 116 having a size equal to or less than the size of the allocated buffer to which the command is assigned. In one embodiment, gateway 106 associates the command and the allocated buffer with the low performance path queue and decrements the available capacity of the low performance path queue.

In block 512, the I/O operation is completed. In one embodiment, gateway 106 completes the operation. In another embodiment, gateway 106 dispatches the I/O operation to flash controller 114, which completes the I/O operation. In one embodiment, gateway 106 disassociates the command and the allocated buffer with the low performance path queue and increments the available capacity of the low performance path queue.

In decision 516, gateway 106 determines whether an error occurred during the execution of low performance path 514. In one embodiment, gateway 106 determines whether an error occurred during the execution of low performance path 514 by determining whether the I/O operation completed successfully. In another embodiment, gateway 106 determines whether an error occurred during any part of the execution of medium performance path 514, including, for example, whether gateway 106 successfully completed decision 502 and blocks 504 and 506 and blocks 510 and 512. If gateway 106 determines that an error occurred during the execution of low performance path 514 (decision 516, YES branch), then gateway 106 proceeds via block E (see FIG. 6). If gateway 106 determines that an error did not occur during low performance path 514 (decision 516, NO branch), then the operations of gateway 106 are complete.

In some embodiments, if gateway 106 determines that an error did not occur during low performance path 514 (decision 516, NO branch), then gateway 106 generates a success message. In one embodiment, gateway 106 sends the success message to host 102. In another embodiment, gateway 106 stores the success message to a log which resides, for example, within gateway 106 or data store 112.

Figure 6:
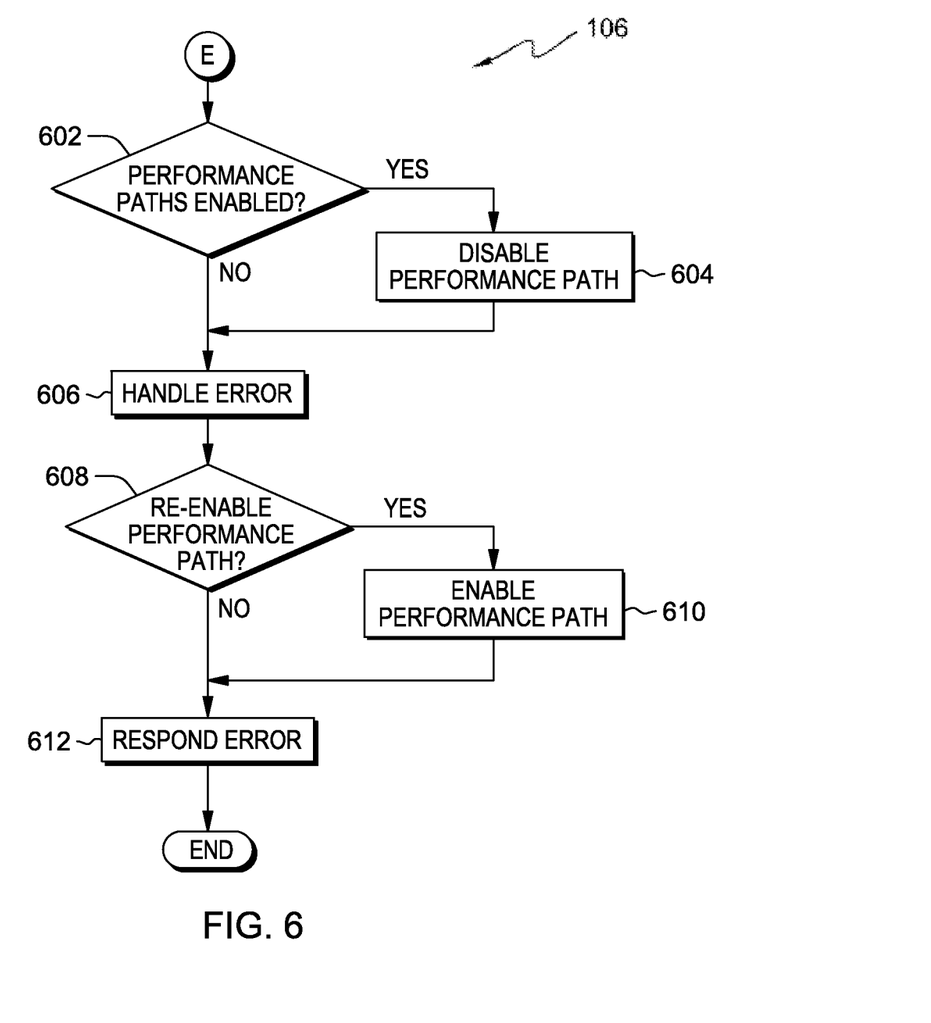
FIG. 6 depicts further operations of gateway 106, according to an embodiment of the present invention.

FIG. 6 depicts further operations of gateway 106, according to an embodiment of the present invention. In one embodiment, the operations depicted in FIG. 6 comprise an error-handling function of gateway 106. In one embodiment, gateway 106 disables performance paths if they are enabled, handles an error condition, and, if applicable, re-enables performance paths. FIG. 6 starts via block E (see FIGS. 2-4 and the respective accompanying discussions).

In decision 602, gateway 106 determines whether performance paths are enabled. In one embodiment, gateway 106 determines whether performance paths are enabled based on a performance path configuration setting of gateway 106. In one embodiment, gateway 106 handles the command through a low performance path if the performance paths are not enabled. If gateway 106 determines that the performance paths are enabled (decision 602, YES branch), then gateway 106 proceeds to block 604. If gateway 106 determines that performance paths are not enabled (decision 602, NO branch), then gateway 106 proceeds to block 606.

In block 604, gateway 106 disables performance paths. In one embodiment, gateway 106 modifies a performance path configuration setting to disable performance paths. In another embodiment, gateway 106 sets a performance path flag to indicate that the performance paths are disabled for error handling. In another embodiment, gateway 106 stores a performance path configuration setting to a performance path configuration setting backup prior to modifying the performance path configuration setting to disable performance paths.

In block 606, gateway 106 handles an error condition. Handling an error may require one or more operations to rectify the error condition. The operations performed in order to handle the error may vary depending on the error. In one embodiment, an error condition is resolved and, in response, gateway 106 removes the error condition. For example, in response to an error condition in which a parity bit fails to reconcile with other read data, gateway 106 may attempt to reconstruct the proper data based on the parity bit or, alternatively, gateway 106 may re-attempt the read operation. As another example, in response to an error condition in which a write operation failed to complete successfully, gateway 106 may re-attempt the write operation at a different address.

In other embodiments, a more error condition may require multiple operations to rectify the error condition. Examples include: a timeout when accessing flash memory array 110 and an uncorrectable error detected by the error correction code or parity bits. In such a case, diagnosis and rectification of the error condition may require multiple operations, such as resetting various hardware or logic components, various error reporting operations, or user intervention.

In decision 608, gateway 106 determines whether to re-enable performance paths. In one embodiment, gateway 106 determines whether to re-enable performance paths based on whether a performance path flag is set to indicate that the performance flags are disabled for error handling. In another embodiment, gateway 106 determines whether to re-enable performance paths based on whether a performance path configuration setting backup indicates that the performance paths are disabled for error handling. If gateway 106 determines that performance paths should be re-enabled (decision 608, YES branch), gateway 106 proceeds to block 610. If gateway 106 determines that performance paths should not be re-enabled (decision 608, NO branch), gateway 106 proceeds to block 612.

In block 610, gateway 106 enables performance paths. In one embodiment, gateway 106 modifies a performance path configuration setting to enable performance paths. In another embodiment, gateway 106 clears a performance path flag to indicate that the performance paths are enabled. In another embodiment, gateway 106 enables performance paths by restoring the performance path configuration setting with the performance path configuration setting backup.

In block 612, gateway 106 responds with an error message. In one embodiment, gateway 106 generates an error message indicating that an error occurred. In one embodiment, gateway 106 sends an error message to host 102. In another embodiment, gateway 106 stores the error message to a log which resides, for example, within gateway 106. In another embodiment, gateway 106 dispatches the command to command processor 118 in response to the error message. In another embodiment, gateway 106 attempts to handle the command again by returning to block 202 of FIG. 2 and performing the operations of FIGS. 2-6 on the command, in which case gateway 106 may track the number of times gateway 106 attempts to handle the command and gateway 106 may re-attempt the command a predetermined number of times.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for non-volatile storage, the method comprising:

receiving, by a gateway processing node, a first command corresponding to a solid-state memory;

receiving, by the gateway processing node, a second command corresponding to the solid-state memory;

in response to determining, by the gateway processing node, (i) that a bypass mode is enabled, (ii) that the first command is a medium-access command, and (iii) that a plurality of performance paths are enabled based on a performance path configuration setting of the gateway processing node, handling, by the gateway processing node, the first command via one of a high performance path and a medium performance path, wherein the bypass mode is configured such that medium-access commands can bypass a command processor via the high performance path and the medium performance path, wherein:

the high performance path is associated with one or more buffers of a first pre-allocated buffer type, wherein each buffer of the first pre-allocated buffer type is of a first buffer size that is equal to a page size of a flash memory array; and the medium performance path is associated with one or more buffers of a second pre-allocated buffer type, wherein each buffer of the second pre-allocated buffer type is of a second buffer size that is greater than the first buffer size and equal to an integer-multiple of the page size of the flash memory array; and in response to determining, by the gateway processing node, at least one of (i) that the bypass mode is disabled and (ii) that the second command is not a medium-access command:

dispatching, by the gateway processing node, the second command to the command processor for handling via a low performance path, wherein the low performance path is associated with one or more command-allocated buffers; and allocating, by the gateway processing node, a command-allocated buffer of the one or more command-allocated buffers to the second command such that the command-allocated buffer is capable of storing the second command.

2. The method of claim 1, further comprising:

determining, by the gateway processing node, that a high performance flag is set for the first command, and in response, handling, by the gateway processing node, the first command via the high performance path.

3. The method of claim 2, further comprising:

determining, by the gateway processing node, that a high performance queue is full, and in response, handling, by the gateway processing node, the first command via the medium performance path;

determining, by the gateway processing node, that a medium performance queue is full, and in response, dispatching, by the gateway processing node, the first command to the command processor for handling via the low performance path; and determining, by the gateway processing node, that a low performance queue is full and in response, sending, by the gateway processing node, a busy message to a host.

4. The method of claim 3, wherein the second command is dispatched to the command processor for handling via the low performance path in response to, at least in part, determining, by the gateway processing node, (i) that a high performance flag is not set for the second command and (ii) that medium performance flag is not set for the second command.

5. The method of claim 4, further comprising:

receiving, by the gateway processing node, a third command;

determining, by the gateway processing node, that the third command is a task management function and, in response, the gateway processing node disabling the bypass mode; and dispatching, by the gateway processing node, the third command to the command processor.

6. The method of claim 5, further comprising:

in response to determining, by the gateway processing node, (i) that an error condition has occurred and (ii) that the plurality of performance paths are enabled based on the performance path configuration setting of the gateway processing node, disabling, by the gateway processing node, the plurality of performance paths;

performing, by the gateway processing node, one or more operations to rectify the error condition; and re-enabling, by the gateway processing node, the plurality of performance paths.

7. The method of claim 6, further comprising:

enabling, by the gateway processing node, the bypass mode in response to completion of a boot operation of the storage system.

8. The method of claim 1, further comprising:

determining, by the gateway processing node, that a medium performance flag is set for the first command, and in response, handling, by the gateway processing node, the first command via the medium performance path.

9. The method of claim 8, further comprising:

determining, by the gateway processing node, that a medium performance queue is full, and in response, dispatching, by the gateway processing node, the first command to the command processor for handling via the low performance path; and determining, by the gateway processing node, that a low performance queue is full and in response, sending, by the gateway processing node, a busy message to a host.

10. The method of claim 1, further comprising:

determining, by the gateway processing node, that allocating the command-allocated buffer to the second command was unsuccessful, and in response, sending, by the gateway processing node, a busy message to a host.

11. A computer system for non-volatile storage, the computer system comprising:

one or more computer processors;

one or more computer readable storage media;

program instructions stored on the one or more computer readable storage media for execution by at least one of the one or more processors, the program instructions comprising:

program instructions to receive, by a gateway processing node, a first command corresponding to a non-volatile solid-state memory;

program instructions to receive, by the gateway processing node, a second command corresponding to the solid-state memory;

program instructions to determine, by the gateway processing node, (i) that a bypass mode is enabled, (ii) that the first command is a medium-access command, and (iii) that a plurality of performance paths are enabled based on a performance path configuration setting of the gateway processing node, and in response, execute program instructions to handle, by the gateway processing node, the first command via one of a high performance path and a medium performance path, wherein the bypass mode is configured such that medium-access commands can bypass a command processor via the high performance path and the medium performance path, and wherein:

the high performance path is associated with one or more buffers of a first pre-allocated buffer type, wherein each buffer of the first pre-allocated buffer type is of a first buffer size that is equal to a page size of a flash memory array; and the medium performance path is associated with one or more buffers of a second pre-allocated buffer type, wherein each buffer of the second pre-allocated buffer type is of a second buffer size that is greater than the first buffer size and equal to an integer-multiple of the page size of the flash memory array; and program instructions to determine, by the gateway processing node, at least one of (i) that the bypass mode is disabled and (ii) that the second command is not a medium-access command, and in response:

execute program instructions to dispatch, by the gateway processing node, the second command to the command processor for handling via a low performance path, wherein the low performance path is associated with one or more buffers; and execute program instructions to allocate, by the gateway processing node, a buffer of the one or more buffers to the second command such that the buffer is capable of storing the second command.

12. The computer system of claim 11, the program instructions further comprising:

program instructions to determine, by the gateway processing node, that a high performance flag is set for the first command, and in response, execute program instructions to handle, by the gateway processing node, the first command via the high performance path.

13. The computer system of claim 12, the program instructions further comprising:
program instructions to determine, by the gateway processing node, that a high performance queue is full, and in response, execute program instruction to handle, by the gateway processing node, the first command via the medium performance path;
program instructions to determine, by the gateway processing node, that a medium performance queue is full, and in response, execute program instructions to dispatch, by the gateway processing node, the first command to the command processor for handling via the low performance path; and
program instructions to determine, by the gateway processing node, that a low performance queue is full and in response, execute program instructions to send, by the gateway processing node, a busy message to a host.

14. The computer system of claim 13, wherein the program instructions to dispatch the second command to the command processor for handling via the low performance path execute in response to, at least in part, program instructions to determine, by the gateway processing node, (i) that a high performance flag is not set for the second command and (ii) that medium performance flag is not set for the second command.

15. The computer system of claim 14, the program instructions further comprising:
program instructions to receive, by the gateway processing node, a third command;
program instructions to determine, by the gateway processing node, that the third command is a task management function and, in response, execute program instructions to disable, the gateway processing node, the bypass mode; and
program instructions to dispatch, by the gateway processing node, the third command to the command processor.

16. The computer system of claim 15, the program instructions further comprising:

program instructions to determine, by the gateway processing node, (i) that an error condition has occurred and (ii) that the plurality of performance paths are enabled based on the performance path configuration setting of the gateway processing node, and in response, execute program instructions to disable, by the gateway processing node, the plurality of performance paths;
program instructions to perform, by the gateway processing node, one or more operations to rectify the error condition; and
program instructions to re-enable, by the gateway processing node, the plurality of performance paths.

17. The computer system of claim 16, the program instructions further comprising:
program instructions to enable the bypass mode of the gateway processing node in response to completion of a boot operation of the storage system.

18. The computer system of claim 11, the program instructions further comprising:
program instructions to determine, by the gateway processing node, that a medium performance flag is set for the first command, and in response, execute program instructions to handle, by the gateway processing node, the first command via the medium performance path.

19. The computer system of claim 18, the program instructions further comprising:
program instructions to determine, by the gateway processing node, that a medium performance queue is full, and in response, execute program instructions to dispatch, by the gateway processing node, the first command to the command processor for handling via the low performance path; and
program instructions to determine, by the gateway processing node, that a low performance queue is full and in response, execute program instructions to send, by the gateway processing node, a busy message to a host.

20. The computer system of claim 11, the program instructions further comprising:
program instructions to determine, by the gateway processing node, that allocating the command-allocated buffer to the second command was unsuccessful, and in response, execute program instructions to send, by the gateway processing node, a busy message to a host.

* * * * *